United States Patent [19]
Paull et al.

[11] 3,827,243
[45] Aug. 6, 1974

[54] METHOD FOR RECOVERING GEOTHERMAL ENERGY

[75] Inventors: Peter L. Paull, Weston, Conn.; Paul F. Kerr, Palo Alto, Calif.

[73] Assignee: Texaco Development Corporation, New York, N.Y.

[22] Filed: Sept. 1, 1972

[21] Appl. No.: 285,783

[52] U.S. Cl................................ 60/641, 166/272
[51] Int. Cl................................................ F03g 7/04
[58] Field of Search................ 60/26, 641; 166/272; 165/45, 164 M

[56] References Cited
UNITED STATES PATENTS

| | | | |
|---|---|---|---|
| 3,140,986 | 7/1964 | Hubbard | 60/26 |
| 3,294,167 | 12/1966 | Vogel | 166/272 |
| 3,379,248 | 4/1968 | Strange | 60/26 UX |
| 3,640,336 | 2/1972 | Dixon | 60/26 |
| 3,676,078 | 7/1972 | Jacoby | 23/299 |

FOREIGN PATENTS OR APPLICATIONS
687,994   2/1953   Great Britain ................ 165/104 M

*Primary Examiner*—Edgar W. Geoghegan
*Assistant Examiner*—H. Burks
*Attorney, Agent, or Firm*—T. H. Whaley; C. G. Ries

[57] ABSTRACT

A method of heating a fluid which can be, for example, molten sodium, in a dry geothermal reservoir formation penetrated by an injection well and a production well comprising injecting the said fluid into the formation via the injection well, forcing the fluid through the formation with simultaneous heating and finally recovering the heated fluid via the production well. Utilizing heat exchangers at the surface, the heated fluid may be employed to supply process heating requirements for steam making, preheating of refinery streams such as crude oil feed to distillation units, salt evaporation, etc.

23 Claims, 1 Drawing Figure

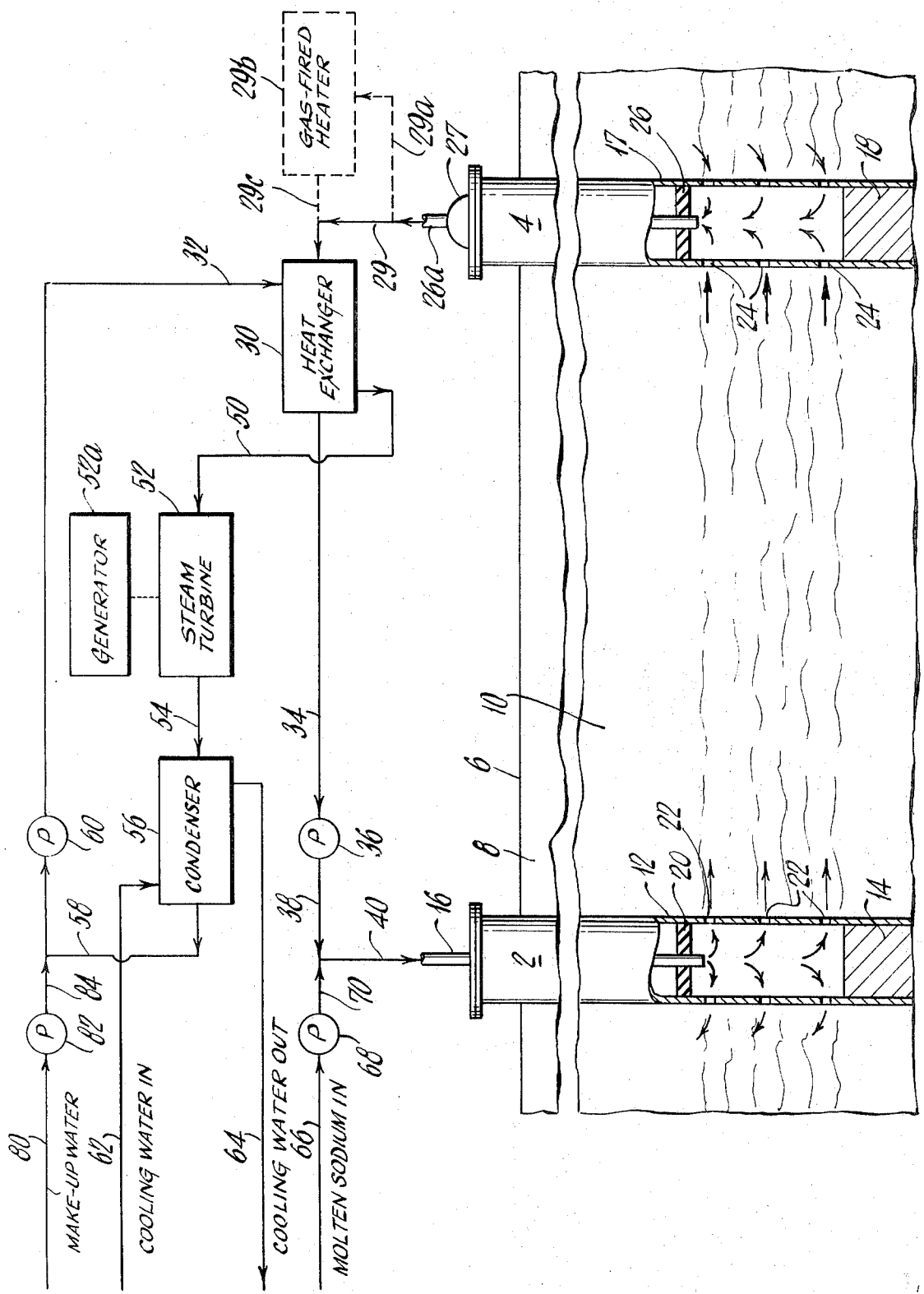

METHOD FOR RECOVERING GEOTHERMAL ENERGY

BACKGROUND OF THE INVENTION

1. Field of the Invention

This invention relates to a method of heating an aqueous fluid. More particularly, this invention relates to a method of heating a non-aqueous fluid in the liquid state in a dry geothermal reservoir formation.

2. Prior Art

One of the major sources of energy in the world is the natural heat of the earth. A number of attempts have been made to recover heat from the geothermal formations or hot formations of the earth; however, only an extremely small quantity of energy compared to the total amount consumed is derived from this source at the present time. In California alone over 1,000,000 acres of land are classified as being in geothermal resource areas. Steam derived from geothermal sources is being employed in the United States, Italy, Mexico, Russia, New Zealand and Japan to drive turbines for electrical power generation. In Iceland, hot water derived from hot artesian wells or springs is transmitted through pipes and utilized in heating buildings and greenhouses.

The desirability of utilizing heat derived from a geothermal source is apparent since the fossil fuel sources, i.e., coal, oil, peat, etc. are limited and can be exhausted within a few hundred years at the present rate of production.

All of the installations in operation today employing energy derived from geothermal sources operate with hot water and/or steam derived from geothermal formations into which underground water flows and becomes heated. One of the most successful geothermal installations is that operated in Northern California to produce electricity. In this geothermal reservoir subterranean water contacting the hot reservoir rock structure is flashed into steam forming a very large steam reservoir at temperatures of the order of 500°–550°F or more while shut-in pressure of the wells below 2,000 feet is 450–480 psig.

The use of steam and/or hot water produced in geothermal reservoirs suffers from several major disadvantages. Frequently, large volumes of noxious gases such as hydrogen sulfide, carbon dioxide, hydrocarbons, ammonia, etc. are produced with the steam or water and these gases must be removed and disposed of in a manner which will not pollute the environment. The mineral content of the steam and/or water recovered from many geothermal wells is so high that the steam recovered may be so corrosive as to preclude its use in turbines, etc. In most instances where water is recovered with the steam, the salinity is usually of such magnitude that the cool brine can be discharged to surrounding streams or lakes only after being treated to reduce the salinity to an acceptable value. Furthermore, many plants which utilize steam from geothermal reservoirs for turbine power generation discharge a condensate from the condensers which is so high in boron that the toxic effluent must be sent to an appropriate treatment plant or returned to the undergrond reservoir through a disposal well.

BRIEF SUMMARY OF THE INVENTION

In its broadest sense this invention is concerned with a method of heating a non-aqueous fluid in a dry, geothermal reservoir formation. In one aspect, this invention relates to a method of heating a non-aqueous fluid in a dry, geothermal reservoir formation penetrated by an injection well and a production well which comprises:

a. introducing a non-aqueous fluid into the formation through the said injection well, b. forcing the said non-aqueous fluid through the said formation thereby heating the said fluid, c. recovering the said heated non-aqueous fluid through the said production well and wherein the temperature of the said geothermal reservoir formation is substantially above the temperature of the fluid introduced into the formation in step (a).

A wide variety of non-aqueous fluids are useful in the method of this invention. Suitable fluids include, for example, low-melting metals in the liquid state, organic liquids and gases. Any non-aqueous fluid having suitable physical and thermodynamic properties which does not react chemically with the geothermal formation to any excessive degree may be employed in the method of this invention.

Organic liquids suitable for injection into the dry, geothermal formation via the injection well include, for example, aliphatic compounds, such as, paraffin hydrocarbons, alcohols, glycols, glycol ethers, aldehydes, ketones, ethers; cycloaliphatic compounds, such as, cycloparaffins; aromatic compounds including aromatic alcohols, aldehydes, ketones, etc.; polynuclear aromatic compounds, heterocyclic compounds, etc. Examples of such materials include heptane, nonane, methyl alcohol, ethyl alcohol, n-propyl alcohol, diethylene glycol, thiodiglycol, triethylene glycol, diethylene glycol monomethyl ether, isobutyl ether, n-amyl ether, vinyl ether ether, 2-methyl butryaldehyde, acetone, methyl isopropyl ketone, cyclohexene, cyclohexane, cycloheptanol, benzene, toluene, xylene, phenol, benzaldehyde, 1-naphthol, biphenyl, diphenyl oxide, diphenyl, methylchlorosilane, thiophene, liquid petroleum hydrocarbons, such as, gasoline, crude oil, etc.

Gases which may be utilized as injection fluids in the process of this invention include, for example, nitrogen, oxygen, hydrogen, carbon dioxide, flue gas, methane, ethane, natural gas, propane, butane, isobutane, cyclobutene, etc.

Low melting metals which may be employed as injected fluids in the process of this invention are exemplified by the metals set forth in the following Table 1:

TABLE 1

| Metal | Melting Point (° F) | Boiling Point (° F) |
|---|---|---|
| Lithium | 352 | 2390 |
| Sodium | 203 | 1637 |
| Potassium | 151 | 1420 |
| Cesium | 83 | 1275 |
| Mercury | −36 | 670 |
| Gallium | 85 | 4320 |
| Indium | 313 | 2640 |
| Bismuth | 520 | 2660 |

Mixtures of low-melting metals as well as alloys such as Wood's alloy (an alloy of bismuth, tin, lead and cadmium in the proportions of 4:2:1:1 which melts at 159°F), etc., can likewise be employed in this process. The particular metal or metals utilized in any particular location will depend on the temperature of the dry geothermal formation in which the non-aqueous fluid is to be heated, etc.

Sodium, lithium, potassium and mercury constitute an especially valuable group of metals for use in the novel process of this invention.

The heated non-aqueous fluid withdrawn from the production well in the process of this invention may be in vapor form, a mixture of vapor and liquid or liquid alone depending on the temperature of the fluid as it leaves the hot, geothermal formation and enters the borehole of the production well and in the pressure maintained in the withdrawal system.

In the process of this invention the heated non-aqueous fluid recovered from the production well can be passed through a boiler or heat exchanger where it is employed to heat and/or vaporize a second fluid or working fluid which can be, for example, water, steam, isobutane, pentane, isopentane, ethylene, glycol, kerosene, crude oil, etc. or, alternatively, the heated fluid recovered from the production well may be utilized directly for heating purposes or as a reactor input stream, etc. and where the recovered heated fluid is a vapor it can be employed directly to drive a turbine, etc.

The working fluid leaving the heat exchanger which can, as previously mentioned, be a vapor, a liquid or a mixture thereof, may be employed in a variety of ways as a heating medium for such process requirements as steam raising, evaporation, reactor heating, preheating of reactor input streams, etc. The heated working fluid may also be employed in agricultural production to heat fields, greenhouses, etc., thus permitting a number of crops to be grown in areas with short growing seasons by preventing frost damage and freezing of the ground.

After the heated non-aqueous fluid withdrawn from the production well has been employed directly, for example, in driving a turbine or has been passed through a suitable heat exchanging device, it is, preferably, recirculated through the system by returning the fluid to the dry geothermal formation via the injection well for reheating or, if desired, it may be used in other ways for processing purposes, etc., and fresh non-aqueous fluid feedstock forced into the formation for heating.

The process of this invention offers a number of distinct advantages over processes previously proposed for utilizing geothermal energy. Since the heated non-aqueous fluid withdrawn from the production well in the process of this invention contains an extremely low dissolved salts content there is no brine disposal problem. Likewise, noxious gases associated with steam produced from geothermal formations in other processes are not present in any appreciable quantity in this process.

BRIEF DESCRIPTION OF THE DRAWING

The FIGURE shown in a schematic drawing illustrating a preferred embodiment of the process of this invention where a non-aqueous fluid in a closed circuit is passed through a geothermal formation, withdrawn from a production well and heat derived from the fluid is utilized in preparing electrical power.

DETAILED DESCRIPTION OF THE INVENTION

As previously pointed out, this invention is concerned with the recovery of energy in the form of heat from a dry geothermal reservoir formation. In this specification a dry geothermal reservoir is defined as a reservoir or system where rock formations generally of limited porosity and permeability are heated by the normal geothermal gradient but where there is no fluid for heat transfer. Wells, i.e., the injection and production wells, employed in the method of this invention can be drilled utilizing the same equipment and techniques employed in drilling wells for the recovery of petroleum hydrocarbons. The dry goethermal reservoir formations generally will be situated from about 1,000 to about 30,000 feet or more below the surface.

A number of injection wells and production wells may be utilized simultaneously in recovering heat from the dry geothermal reservoir. Such wells may be arranged in any convenient pattern such as the inverted five-spot pattern, the inverted seven-spot pattern, or in any other suitable pattern. In the inverted five-spot pattern four production wells are situated at corners of a square while a single input well is located at the center of the square. The distance between a production well and an injection well can be varied widely depending upon the temperature of the formation, the particular non-aqueous fluid being circulated through the hot formation, the circulation rate of the fluid and the increase in temperature desired in the injected non-aqueous fluid, etc. Generally, the distance between any particular injection well and production well will be from about 10 to about 400 feet or more.

If the fluid conductivity of the dry, geothermal reservoir formation penetrated by the injection or production well is found to be low, as is frequently the case, it may be desirable to subject either the formation in the injection well, production well or both to remedial action in order to increase the permeability of the formation. One common method for increasing the permeability of a formation which has been practiced for a number of years in the art is known as hydraulic fracturing. In this method artificial fractures or channels of high fluid conductivity within the formation can be formed.

The dry, geothermal reservoir formation in the injection well or the production well employed in this process can be conveniently fractured by methods well known in the art by pumping a fluid down the well bore and into contact with the formation at a rate higher than that at which the fluid can flow into and through the formation. On continued injection of the fluid, the pressure within the well bore increases to a pressure at which the formation breaks down to create one or more fractures or fissures extending outwardly from the well bore into the formation. The hydraulic fracturing fluid is injected into the formation at a sufficient pressure and flow rate to generate the required fracture and to displace the fluid into the fracture under laminar flow conditions. Any of the commonly employed hydraulic fracturing fluids such as water, hydrocarbon oils or oil-in-water emulsions, etc., together with viscosity thickeners and other additives may be used in fracturing the dry geothermal reservoir formations.

Where an aqueous hydraulic fracturing fluid is utilized it is preferred to thoroughly dry the fractured formation prior to introducing the non-aqueous fluid into the formation. This can be accomplished by venting either the injection well and/or production well to permit the water to escape as steam, by blowing air through the formation or by any other convenient method.

After the pressure on the fracturing fluid has been reduced, the fractures will tend to close somewhat because of the unbalanced compressive forces in the formation. If desired, propping agents may be included in the hydraulic fracturing fluids previously described to prevent closure of the fractures, or they may be introduced into the fractured formation as a component of an aqueous fluid, a hydrocarbon fluid, etc. after the initial fracturing operation has been completed. Useful propping agents include round sand grains, metallic shot, plastic particles, glass beads, ceramic particles, etc.

The quantity of the fracturing fluid required per well will vary widely depending on the physical properties of the formation, the thickness. For example, in a typical fracturing operation of a well employed in the process of this invention a mixture comprising about 20,000 to about 60,000 pounds of sand in 4,000 barrels or more of kerosene is used.

Hydraulic fracturing methods suitable for use in fracturing wells completed in dry, geothermal reservoir formations are more fully described in U.S. Pat. Nos. 3,638,727, 3,010,513, 3,366,176, 3,376,929, 3,497,008, 2,944,018, 2,962,095, 3,149,673, 3,175,615, 3,317,967, etc.

One of the difficulties encountered in introducing or injecting fluids such as the non-aqueous fluids employed in this process is that frequently because of erosion, dissolution, etc., collapsing or sloughing of well bore walls and adjacent formation will occur. It has been found, however, that such problems can be conveniently overcome by electrolessly metal plating the particles of the dry, geothermal reservoir formation in the vicinity of the well bore of the injection well and/or production well so as to form a metallized, permeable consolidated zone. An added advantage of such treatment is that the rate of heat transfer between the injected fluid and the geothermal formation in such plated zones is considerably improved. Another advantage is that where the well has been fractured with a liquid containing propping agent during the electroless metal plating operation the propping agent is cemented in place with the formation by a thin metal film which prevents migration of the grains and protects them from chemical and erosive action of the injected fluid.

The formation may be metallized in the manner described above in either the injection or production well regardless of whether or not the well formation has been fractured. Preferably, however, where the well has been fractured the electroless plating operation is conducted at the conclusion of the fracturing step.

In carrying out the electroless plating operation an aqueous solution containing an activating agent, such as colloidal palladium, is injected into the formation for the purpose of activating he surface of the particles to be treated. Finally, an aqueous solution containing a metal plating compound and a reducing agent is injected into the formation.

In the plating operation there is no necessity in forming a continuous metal matrix to bond the particles of the formation together. Although such a continuous metal matrix may be formed, if desired, generally it is necessary only to inject sufficient metal plating solution to adequately cover the formation particles, thereby sealing them off from subsequent contact with the hot injected fluid. The amount of the plating solutions injected must therefore be carefully controlled to avoid plugging the formation due to deposition of metal in the essential flow channels thereof.

When the particles of the dry, geothermal reservoir formation are first treated by contacting the mass with an activator liquid capable of catalyzing the particles of the formation and thereafter contacting the catalyzed or activated formation with a metal deposition solution containing chemicals comprising polyvalent metal ions and a reducing agent, the metal is reduced to the free metal and deposited on the surface of the particles contained in the formation. In order to prevent plugging of the formation during the plating operation, generally the amount of fluid should be only sufficient to coat the formation particles within the first few feet of the formation immediately adjacent to the injection well bore. When properly performed, this procedure results in forming an impermeable layer of metal surrounding the grains or particles and, in addition, binds the grains together into a permeable consolidated form, thereby isolating such particles from the action of the fluids subsequently injected. The particles are therefore no longer susceptible to dissolution and erosive effects of the relatively high temperature fluids being forced through the formation, and the stabilization is relatively long-termed. The amount of either the activator or metal plating solution utilized in practicing the electroless plating step will depend on the particular formation being treated. The treated area will ordinarily form generally cylindrically or spherically shaped regions extending from one to about ten feet or more into the formation from the injection well bore.

In accomplishing the first step of the electroless plating operation, the activator formulation is injected into the zone in which metallization is sought to be accomplished. Acidic solutions of palladium chloride and/or stannous chloride can be used, or the corresponding bromide, nitrate or sulfate solutions. The activator solution should also contain a reducing agent, such as hydrazine, sodium hypophosphate, a lower aldehyde, e.g., formaldehyde, etc.

Preferably, the activator liquids are acid aqueous solutions acidified with acetic, formic or hydrochloric acid, etc. Other activator fluids which can be employed are aqueous solutions containing gold, ruthenium, rhodium or platinum, etc., together with a reducing agent such as hydrazine, and with or without a protective colloid such as gum arabic, tragacanth gum, gelatin, etc. The function of the reducing agent is to reduce the metal salt in the activator solution to the free metal which may be in colloidal form. Other activator liquids commonly used for electroless metal plating of non-metallic objects may similarly be used.

After the activator fluid has been injected into and has adequately contacted the formation to be stabilized, it may be, if desired, displaced by an inert spacer fluid such as water, brine or a very dilute activator solution (i.e., one of the previously mentioned activator solutions diluted by a factor of 15 or more), etc. For example, an aqueous sodium chloride solution containing in the range of from 5 to 20 weight percent sodium chloride may be injected so as to displace the activator solution away from the well bore. Under certain formation conditions it may be possible and/or desirable to inject air into the formation to accomplish the same purpose.

The metal-containing plating solution can be acidic, having a pH of from 2 to 6, and a pH range of from 4 to 6 is especially preferable. Alkaline metal plating solutions may also be used, where desirable.

Metal plating compositions suitable for use in the preparation of this invention include, for example, nickel, iron, or cobalt chlorides and/or the corresponding sulfates. Reducing compositions useful in such electroless plating compositions include reagents such as hypophosphorous acid, hypophosphites, e.g., sodium hypophosphite, or alkaline solutions of formate, molybdenate and/or hydroxy carboxylates. The metal-containing compounds and the reducing agents may be present in concentrations ranging from about 1 to about 40 percent by weight each. A variety of suitable activator solutions as well as electroless metal plating solutions have been described in U.S. Pat. Nos. 3,393,737, 3,500,926, 3,500,927, 3,586,524, 3,438,411, etc., which are incorporated herein by reference. Wetting agents may be employed in the above-described solutions in order to promote the wetting of the surfaces to be stabilized.

In the FIGURE there is shown injection well 2 and production well 4 which extend from the surface of earth 6 down through the upper formation 8 into a dry, geothermal formation 10 exhibiting a temperature of about 750°F. Well 2 is cased with steel pipe casing 12 and the bottom of the well is plugged back with a suitable layer or plug 14. The 10-foot interval above plug 14 of casing in well 2 is perforated in a conventional manner to form a fluid passageway between the well bore and formation 10 via perforations 22. Steel tubing 16 is installed in the well bore to a point about 10 feet above plug 14 where it passes through packer 20.

Well 4 is cased with steel pipe casing 17 and the bottom of this well is plugged back with a suitable cement layer 18. Both wells 2 and 4 are completed at the same depth in the dry, geothermal formation. The 10-foot interval above plug 18 of casing 16 is perforated in conventional manner to form a fluid passageway between the well bore and the formation 10 via perforations 24. Steel tubing 26a is installed in the well bore of well 4 to a point about 10 feet above plug 18 where it passes through packer 26.

By means of high pressure pump 22 molten sodium at a temperature of about 450°F is passed via lines 38 and 40 into tubing 16 of well 2. The molten sodium is then transmitted downwardly through tubing 16 and forced into formation 10 through perforations 22. As the molten sodium is forced through the formation 10 it is heated and enters the well bore of well 4 through perforations 24 at a temperature of about 590°F. From the well bore of well 4 it is withdrawn via tubing 26a by means of pump 27 and passed via line 29 through heat exchanger 30 where it is utilized to heat in a countercurrent manner a fluid stream, such as water. The molten sodium stream at a temperature of about 420°F leaving heat exchanger 30 is sent by means of line 34 to the suction side of high pressure pump 36. From the discharge side of pump 37 the molten sodium stream is returned via lines 38 and 40 into tubing 16 through which it is injected into the formation 10 for reheating. The water stream enters heat exchanger or boiler 30 via line 32 and is withdrawn via line 50 as saturated steam or as a mixture of steam and water at a pressure of about 80 psia. By means of line 50 the steam is passed into low pressure steam turbine 52 which is directly connected to a suitable electrical generator 52a. Low pressure steam leaving steam turbine 52 is conducted by means of line 54 to condenser 56 where the low pressure steam is condensed. Condensate from condenser 56 is passed via line 58 to the inlet of pump 60 from which it is sent via line 32 back to heat exchanger 30 for revaporization. Condenser 56 is cooled by means of cooling water which enters the condenser via line 62 and leaves via line 54. The initial charge of molten sodium enters the system through line 66 and is pumped by means of pump 68 through line 70 into line 40. Makeup water is introduced into the turbine system via line 80, pump 82 and line 84. Optionally, additional heat may be added to the molten sodium stream, leaving pump 27 by passing the sodium stream via line 29a through gas-fired heater 29b and returning the molten sodium stream via line 29c to heat exchanger 30 heated to a temperature substantially above the temperature at which the sodium stream leaves well 4.

In the following example the electroless plating of the formation in the injection well and production well is illustrated.

In an injection well completed in a dry, geothermal reservoir at 12,000 feet having a temperature of 650°F a zone perforated over a distance of 8 feet is isolated with appropriate packers.

The formation is then electrolessly plated with nickel by first injecting into the formation, at a rate of 0.5 barrels per minute, 40 barrels of activator solution of the following composition:

TABLE 2

|  | 1 Barrel |
|---|---|
| Water | 40.7 gallons |
| Gum arabic | 20.6 gms |
| Hydrazine hydrate (85%) | 256 cc (or 400 cc of 35% hydrazine) |
| Palladium chloride solution* | 636 cc |
| Buffers: | |
| Formic acid (90%) | 640 cc |
| Sodium formate | 7 pounds |

*Contains 1.6 gms PdCl$_2$, 10 cc conc. HCl, 90 cc distilled or deionized water.
NOTE: Chemical must be added to the water in the order listed with complete mixing and dissolving before adding the next chemical.

In the next step, 50 barrels of brine (10 percent by weight of sodium chloride) is injected into the formation to serve as a spacer. The nickel plating solution (65 barrels) is then injected into the formation at the rate of 0.4 barrels per minute and at about 2,000 psig. The composition of the electroless nickel plating solution employed is as follows:

TABLE 3

| (a) | 807 gallons filtered drinking water |
| (b) | 885 pounds NiSO$_4$·6H$_2$O |
| (c) | 1260 pounds NaH$_2$PO$_2$·H$_2$O |
| (d) | 945 pounds Na acetate·3H$_2$O |
| (e) | 315 pounds Na succinate·6H$_2$O |
| (f) | 252 gallons glacial acetic acid |
| (g) | a solution of 89 pounds FeSO$_4$ is added thereafter |

The above plating process is repeated in a production well completed in the same formation and located about 100 feet from the injection well.

In operating the heating process of this invention utilizing the injection well of this example, no appreciable reduction in input rate of the fluid, i.e., crude oil at a temperature of 150°F, is noted after one week, indicating that the nickel electrolessly plated on the formation is a satisfactory method of preventing dissolution and erosion of the formation in the injection well and production well.

In order to avoid loss of the fluid introduced into the formation via the injection well, it may be important with certain formations to prevent, or at least minimize, losses of the liquid metal by further treatment of the formation. Such treatment can, for example, consist of plugging off possible paths of liquid loss. This can be accomplished in a variety of ways well known in the art, such as by introducing a sealing or plugging material into the formation along the boundaries of the fissures or openings established during the fracturing process, thereby forming an impermeable envelope around the fractured zone. Optionally, it may be desirable to first establish fluid communication by forcing air, a liquid hydrocarbon or any other suitable fluid, prior to the introduction of a suitable plugging composition.

A particularly valuable plugging composition comprises an aqueous solution of sodium silicate, a gelling catalyst and a clay, such as attapulgite, disposed in it for thickening. Such compositions are prepared by adding a solution of sodium silicate in water to an aqueous solution of hydrochloric acid with agitation. The dry powdered clay is then added to the mixture of the liquids with continuing agitation. Filler materials as exemplified by gilsonite, expanded perlite, mica flake, etc., may also be added to the silicate compositions described above. The particle size of the added filler material, which may be varied over a wide range, is limited only by the capability of pumping equipment for forcing the silicate solution into the formation. Useful silicate solutions, as well as detailed instructions for plugging an underground formation, are more fully described in U.S. Pat. No. 3,411,582, which is incorporated herein by reference in its entirety.

In a typical treatment operation a silicate solution is prepared by adding to 2,000 gals of 10.5 percent aqueous hydrochloric acid with agitation 2,000 gals of a sodium silicate solution previously prepared by mixing together 1,200 gals of water and about 800 gals of an aqueous sodium silicate solution, analyzing 8.30 percent $Na_2O$, 27 percent $Si_2O$, with the balance being water. To this sodium silicate solution there is added with stirring 1,000 pounds of dry, powdered attapulgite.

A total of 2,000 gals of the thus-prepared composition is immediately pumped via an injection well through a 10 foot perforated zone of a geothermal formation (temperature 580°F) at a pumping pressure of about 1,000 psi over a period of about 0.5 hour. The same quantity of the silicate composition is then forced into the formation via a production well situated above 200 feet from the injection well and perforated over a 10-foot interval at the same depth as in the injection well. The wells are allowed to stand over a period of about 24 hours after which they are vented to permit the removal of water vapor. In a final step, dry air at a temperature of 300°F is circulated through the formation and removed via the production well to complete the drying process.

A wide variety of other types of plugging formations may be employed in sealing off the outer boundaries of the fractured formation in either the injection or production wells. For example, phenol-formaldehyde resins may be employed. In such cases, an unpolymerized or partially polymerized mixture of phenol-formaldehyde with a suitable catalyzing agent, such as aqueous sodium hydroxide, is pumped down the bore hole and out into the formation. The amount of polymeric plugging agent employed is dependent on a variety of conditions including formation characteristics, chemical composition, degree of fracture, and so forth. Generally, about 0.5 to about 60 barrels per vertical foot of the perforated interval in the well will be employed although more or less can be used.

As soon as the resinous composition is injected into the formation preferably there is introduced an inert neutral flushing agent to move the resinous materials towards the extremities of the fractured zone. The amount of this flushing agent will vary widely depending upon the amount of polymerization which has taken place in the resin when it is injected. Generally, about 1 to about 5 barrels per foot of perforated interval will be employed in the case of a completely unpolymerized resin and in the case of a partially polymerized resin mixture up to as much as 20 barrels or more per perforated foot will be used. The amount of this flushing agent is not critical and substantially more or less may be employed. Finally, the well is shut in to permit the resin to set in place. Depending upon the polymeric resin employed, the setting time will range from about 6-60 hours or more.

The use of polymeric plugging agents is not restricted to the phenol-formaldehyde type described above. A variety of resins may be utilized, such as alkyd resins, acrylic resins, etc., may be employed. Examples of such resins are set forth in U.S. Pat. Nos. 2,378,817, 2,604,172 and 2,823,753. The utilization of phenol-formaldehyde resins in sealing off underground formations together with suitable polymer formulations is more completely described in U.S. Pat. No. 3,285,339, which is incorporated herein by reference in its entirety.

Other types of plugging materials may be employed in sealing off the outer boundaries of fractured zones between the injection well and the production well. For example, certain cellulose derivatives and alkyl silicates may be utilized. Examples of useful cellulose materials include cellulose esters, such as cellulose acetate, cellulose butyrate, etc., while examples of useful alkyl silicates include, for example, those having less than 5 carbons in the alkyl group, such as, ethyl silicate, n-propyl silicate, etc. The plugging formulations employing such cellulose materials as cellulose esters and alkyl silicates are prepared by dissolving these compositions in a suitable organic solvent which can be ethyl alcohol, methyl ethyl ketone, diethyl ketone, etc. Other organic solvents which are useful are gasoline, kerosene, benzene, toluene and xylene. This process for sealing off underground formations is described in detail in U.S. Pat. No. 2,747,671, which is incorporated herein by reference.

If desired, these formulations can contain natural or synthetic resins, such as polymers obtained from the polymerization of betapinene, and other synthetic resins such as polymers of butadiene, styrene, acrylonitrile, etc.

What is claimed is:
1. A method of heating a fluid in a dry, geothermal reservoir formation penetrated by an injection well and a production well which comprises:
   a. introducing a non-aqueous fluid into the formation through the said injection well, b. forcing the said non-aqueous fluid through the said formation thereby heating the said fluid, c. recovering the said heated fluid through the said production well and wherein the temperature of the said dry, geothermal reservoir formation is substantially above the temperature of the fluid introduced into the formation in step (a).

2. The method of claim 1 wherein the said non-aqueous fluid is selected from the group consisting of:

I. low-melting metals in the liquid state,
II. organic liquids, and
III. gases.

3. The method of claim 1 wherein the said non-aqueous fluid is a low-melting metal in the liquid state.

4. The method of claim 1 wherein the said non-aqueous fluid is an organic liquid.

5. The method of claim 4 wherein the said organic liquid is crude oil.

6. The method of claim 1 wherein the said non-aqueous fluid is a gas.

7. The method of claim 1 wherein the said non-aqueous fluid is low-melting metal in the liquid state, selected from the group consisting of sodium, lithium, potassium and mercury.

8. The method of claim 7 wherein the said low-melting metal is sodium.

9. A method of heating a fluid in a dry geothermal reservoir formation penetrated by an injection well and a production well which comprises:

a. introducing a non-aqueous fluid into the formation through the said injection well,
b. forcing the said non-aqueous fluid through the said formation thereby heating the said fluid,
c. recovering the said heated fluid through the said production well, wherein the temperature of the said dry geothermal reservoir formation is substantially above the temperature of the fluid introduced into the formation in step (a), and wherein prior to step (a) the formation in the said injection well is hydraulically fractured.

10. A method of heating a fluid in a dry, geothermal reservoir formation penetrated by an injection well and a production well which comprises:

a. introducing a non-aqueous fluid into the formation through the said injection well,
b. forcing the said non-aqueous fluid through the said formation thereby heating the said fluid,
c. recovering the said heated fluid through the said production well, wherein the temperature of the said dry, geothermal reservoir formation is substantially above the temperature of the fluid introduced into the formation in step (a), and wherein prior to step (a) the formation in both the said injection well and in the said production well is hydraulically fractured.

11. The method of claim 10 wherein pior to step (a) the formation in both the said injection well and in the said production well is hydraulically fractured using a fracturing fluid containing a propping agent.

12. The method of claim 10 wherein the formation in both the injection well and in the production well is hydraulically fractured and wherein a plugging solution is forced into the formation to seal off the formation at the boundaries of the fractured zone.

13. The method of claim 1 wherein the temperature of the fluid introduced into the formation via the said injection well is about 0° to about 550°F.

14. The method of claim 1 wherein the temperature of the said formation varies from about 250° to about 900°F.

15. The method of claim 1 wherein the temperature of the said formation is about 400 to about 700°F.

16. The method of claim 1 wherein the temperature of the heated fluid recovered from the said production well is about 200° to about 600°F.

17. A method of heating a fluid in a dry, geothermal reservoir formation penetrated by an injection well and a production well which comprises:

a. introducing a non-aqueous fluid into the formation through the said injection well,
b. forcing the said non-aqueous fluid through the said formation thereby heating the said fluid,
c. recovering the said heated fluid through the said production well, wherein the temperature of the said dry, geothermal reservoir formation is substantially above the temperature of the fluid introduced into the formation in step (a), and wherein the formation in the vicinity of the well bore of the injection well is electrolessly metal plated prior to step (a) thereby forming a permeable, consolidated formation which is thermally stable.

18. The method of claim 17 wherein the formation in the vicinity of the well bore of the injection well is electrolessly nickel plated prior to step (a) thereby forming a permeable, consolidated formation which is thermally stable.

19. A method of heating a fluid in a dry, geothermal reservoir formation penetrated by an injection well and a production well which comprises:

a. introducing a non-aqueous fluid into the formation through the said injection well,
b. forcing the said non-aqueous fluid through the said formation thereby heating the said fluid,
c. recovering the said heated fluid through the said production well, wherein the temperature of the said dry, geothermal reservoir formation is substantially above the temperature of the fluid introduced into the formation in step (a), and wherein the formation in the vicinity of the well bore of the injection well and of the production well is electrolessly metal plated prior to step (a) thereby forming a permeable, consolidated formation in the injection well and in the production well which is thermally stable.

20. The method of claim 19 wherein the formation in the vicinity of the well bore of the injection well and of the production well is electrolessly nickel plated prior to step (a) thereby forming a permeable, consolidated formation in the injection well and in the production well which is thermally stable.

21. The method of claim 1 wherein said heated fluid recovered through the said production well is passed through a heat exchange zone wherein a second fluid is heated.

22. The method of claim 1 wherein said heated fluid recovered through said production well is passed through a heat exchange zone wherein water is heated to form steam.

23. The process of claim 7 wherein the said non-aqueous fluid is mercury.

* * * * *